(12) United States Patent
Kim et al.

(10) Patent No.: US 7,175,280 B2
(45) Date of Patent: Feb. 13, 2007

(54) PROJECTION DISPLAY WITH POLARIZATION BEAM SPLITTER

(75) Inventors: Sung-ha Kim, Seoul (KR); Kun-ho Cho, Suwon-si (KR); Dae-sik Kim, Suwon-si (KR); Hee-joong Lee, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/795,459

(22) Filed: Mar. 9, 2004

(65) Prior Publication Data

US 2004/0263788 A1 Dec. 30, 2004

Related U.S. Application Data

(60) Provisional application No. 60/457,568, filed on Mar. 27, 2003.

(30) Foreign Application Priority Data

Apr. 16, 2003 (KR) ........................ 10-2003-0023975

(51) Int. Cl.
   *G03B 21/00* (2006.01)
   *G03B 21/14* (2006.01)
(52) U.S. Cl. ............................... 353/31; 353/38
(58) Field of Classification Search .................. 353/31, 353/32, 34, 37, 84, 38; 359/196, 209, 210, 359/213; 348/742–743, 771
See application file for complete search history.

(56) References Cited

U.S. PATENT DOCUMENTS

| 6,288,815 | B1 * | 9/2001 | Lambert | 359/196 |
| 6,332,684 | B1 * | 12/2001 | Shibatani et al. | 353/31 |
| 6,493,149 | B2 * | 12/2002 | Ouchi | 359/634 |
| 6,831,706 | B2 * | 12/2004 | Abe et al. | 353/31 |
| 6,840,623 | B2 * | 1/2005 | Li | 353/31 |
| 2002/0191154 | A1 | 12/2002 | Shahzad et al. | |
| 2003/0072079 | A1 * | 4/2003 | Silverstein et al. | 353/20 |
| 2003/0095213 | A1 * | 5/2003 | Kanayama et al. | 348/742 |

* cited by examiner

*Primary Examiner*—Christopher Mahoney
(74) *Attorney, Agent, or Firm*—Sughrue Mion, PLLC

(57) ABSTRACT

A projection system including a light source, a color separator, a scrolling unit, a light valve, a wire grid polarization beam splitter, and a projection lens unit is provided. The color separator separates an incident beam according to color. The scrolling unit scrolls the color beams. The light valve processes an incident beam according to an image signal and forms a color picture. The wire grid polarization beam splitter is disposed between the scrolling unit and the light valve and transmits or reflects an incident beam according to a polarization of the incident beam. The projection lens unit magnifies the color picture formed by the light valve and reflected by the wire grid beam splitter and projects the magnified color picture onto a screen.

13 Claims, 13 Drawing Sheets

PROJECTION DISPLAY WITH POLARIZATION BEAM SPLITTER

This application claims the priority of Korean Patent Application No. 2003-23975, filed on Apr. 16, 2003, in the Korean Intellectual Property Office, and the benefit of U.S. Patent Provisional Application No. 60/457,568, filed on Mar. 27, 2003, in the U.S. Patent Trademark Office, the disclosures of which are incorporated herein in their entireties by reference.

BACKGROUND OF THE INVENTION

1. Field of the Invention

An apparatus consistent with the present invention relates to a projection system and, more particularly, to a projection system which can improve contrast using a wire grid polarization beam splitter.

2. Description of the Related Art

In a conventional projection system, a light valve, such as a liquid crystal display (LCD) or a Digital Micro-mirror Device (DMD), controls the on/off operation of light emitted from a light source on a pixel-by-pixel basis and forms a picture, and a magnifying projection optical system enlarges the picture to be displayed on a large screen.

Projection systems are classified into 3-panel projection systems or single-panel projection systems according to the number of light valves that are used. A 3-panel projection system provides better light efficiency than a single-panel projection system but is more complicated and expensive than the single-panel projection system. The single-panel projection system can include a smaller optical system than the three-panel projection system but provides only ⅓ of the light efficiency of the three-panel projection systems, because red (R), green (G), and blue (B) colors, into which white light is separated, are sequentially used. More specifically, in the single-panel projection system, white light radiated from a white light source is separated into three color beams, namely, R, G, and B color beams, using color filters, and the three color beams are sequentially sent to a light valve. The light valve operates according to the sequence of color beams received to create images. Since the single-panel projection system sequentially uses color beams, the light efficiency is reduced to ⅓ of the light efficiency of a three-panel projection system.

A color scrolling method has been recently developed in which the light efficiency of the single-panel projection system is increased. In the color scrolling method, R, G, and B beams, into which white light is separated, are simultaneously sent to different locations on a light valve. Since an image cannot be produced until all of the R, G, and B beams reach each pixel of the light valve, the R, G, and B color beams are moved at a constant speed by a color scrolling means.

FIG. 1 is a schematic diagram of a single-panel scrolling projection system disclosed in U.S. Publication No. 2002/191154 A1. Referring to FIG. 1, white light emitted from a light source 100 passes through first and second lens arrays 102 and 104, a polarization conversion system (PCS) 105, and a condenser lens 107, and is separated into R, G, and B color beams by first through fourth dichroic filters 109, 112, 122, and 139. More specifically, the red beam R and the green beam G, for example, pass through the first dichroic filter 109 and travel along a first light path $L_1$, while the blue beam B is reflected by the first dichroic filter 109 and travels along a second light path $L_2$. The red beam R and the green beam G on the first light path $L_1$ are separated by the second dichroic filter 112. The red beam R continues along the first light path $L_1$, passing through the second dichroic filter 112, and the second dichroic filter 112 reflects the green beam G along a third light path $L_3$.

The red, green, and blue beams R, G, and B are scrolled while passing through first through third prisms 114, 135, and 142, respectively. The first through third prisms 114, 135 and 142 are disposed in the first through third light paths $L_1$, $L_2$, and $L_3$, respectively, and as the first, second, and third prisms 114, 135, and 142 rotate at a uniform speed, R, G, and B color bars are properly scrolled. The green and blue beams G and B, which travel along the second and third light paths $L_2$ and $L_3$, respectively, are transmitted and reflected by the third dichroic filter 139, respectively, and combined. The red, green, and blue beams R, G, and B are then combined by the fourth dichroic filter 122. The combined beam is transmitted by a polarization beam splitter (PBS) 127 and forms a picture using a light valve 130.

The scrolling of the R, G, and B color bars due to rotation of the first through third prisms 114, 135, and 142 is illustrated in FIG. 2. Scrolling represents the movement of color bars formed on the surface of the light valve 130 when the first, second, and third prisms 114, 135, and 142 corresponding to R, G, and B colors, respectively, are synchronously rotated.

A color image obtained by turning the pixels of the light valve 130 on or off according to an image signal is magnified by a projection lens (not shown) and projected onto a screen.

Since the conventional projection system uses different light paths for different colors, a light path correction lens must be included for each of the colors, components for unifying the separated light beams must be further included, and separate components must be included for each of the colors. Hence, the conventional optical system is bulky, and the manufacturing and assembly thereof is complicated, thus decreasing the yield.

Three motors for rotating the first, second, and third scrolling prisms 114, 135, and 142 generate much noise during operation. Thus, the projection system adopting three motors is manufactured at a greater cost than a color wheel type projection system which utilizes a single motor.

In order to produce a color picture using a scrolling technique, color bars as shown in FIG. 2 must be scrolled at a constant speed. Hence, the conventional projection system must synchronize the light valve 130 with the three prisms 114, 135, and 142 in order to achieve proper scrolling. However, controlling the synchronization is not easy. Due to the circular motion of the scrolling prisms 114, 135, and 142, the color scrolling speed by the three scrolling prisms is irregular, consequently deteriorating the quality of the resultant image.

The conventional projection system uses a dielectric-coated MacNeille type PBS. Since the dielectric-coated MacNeille type PBS does not properly split a beam with a wide incidence angle according to polarization direction, contrast is degraded.

SUMMARY OF THE INVENTION

An apparatus consistent with the present invention provides a projection system which can improve contrast using a wire grid polarization beam splitter and is made compact by the use of a single scrolling unit to scroll color bars.

According to a first exemplary embodiment of the present invention, there is provided a projection system comprising a light source, a color separator, a scrolling unit, a light valve, a wire grid polarization beam splitter, and a projection lens unit. The color separator separates an incident beam according to color. The scrolling unit includes at least one lens cell and converts a rotation of the lens cell into a rectilinear motion of an area of the lens cell through which light passes so that the incident beam is scrolled. The light valve processes a beam transmitted by the color separator and the scrolling unit according to an image signal and forms a color picture. The wire grid polarization beam splitter is disposed in front of the light valve and transmits or reflects an incident beam according to a polarization of the incident beam. The projection lens unit magnifies the color picture formed by the light valve and reflected by the wire grid polarization beam splitter and projects the magnified color picture onto a screen.

According to one aspect of the first exemplary embodiment, the wire grid polarization beam splitter includes a substrate and wire grids, which are formed on one surface of the substrate. The wire grid polarization beam splitter is disposed such that the wire grids face the light valve.

According to another aspect of the present invention, the color separator includes first, second, and third dichroic filters, which are disposed between the light source and the scrolling unit at different angles and each transmit a beam of a color and reflect beams of all other colors.

According to another aspect of the present invention, the color separator includes first, second, and third dichroic prisms, which are sequentially attached to one another between the light source and the scrolling unit. The first, second, and third dichroic prisms respectively include first, second, and third dichroic filters, each of which transmits a beam of a color and reflects beams of all other colors.

According to another aspect of the present invention, the color separator includes first, second, and third dichroic filters, which are disposed in parallel between the scrolling unit and the light valve and each transmit a beam of a color and reflect beams of all other colors. A prism may be installed in front of this color separator.

According to another aspect of the present invention, the scrolling unit includes a spiral lens disk on which at least one cylindrical lens cell is spirally arranged.

According to another aspect of the present invention, the scrolling unit includes first and second spiral lens disks, which are disposed apart from each other and each include at least one cylindrical lens cell that is spirally arranged, and a glass rod installed between the first and second spiral lens disks.

According to another aspect of the present invention, the light valve is a reflective liquid crystal display.

According to another aspect of the present invention, the projection system further includes a spatial filter, which controls the divergence angle of the light emitted from the light source, a polarization conversion system, which converts an unpolarized incident beam into a beam having a single polarization, and a collimating lens, which collimates incident light, which are disposed between the light source and the scrolling unit.

According to another aspect of the present invention, the projection system further comprises first and second cylindrical lenses which are respectively disposed in front of and behind the scrolling unit.

According to another aspect of the present invention, the projection system further comprises first and second fly-eye lens arrays which are sequentially disposed on a light path between the scrolling unit and the light valve. A relay lens is disposed on a light path between the second fly-eye lens array and the light valve.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

Figure 1:
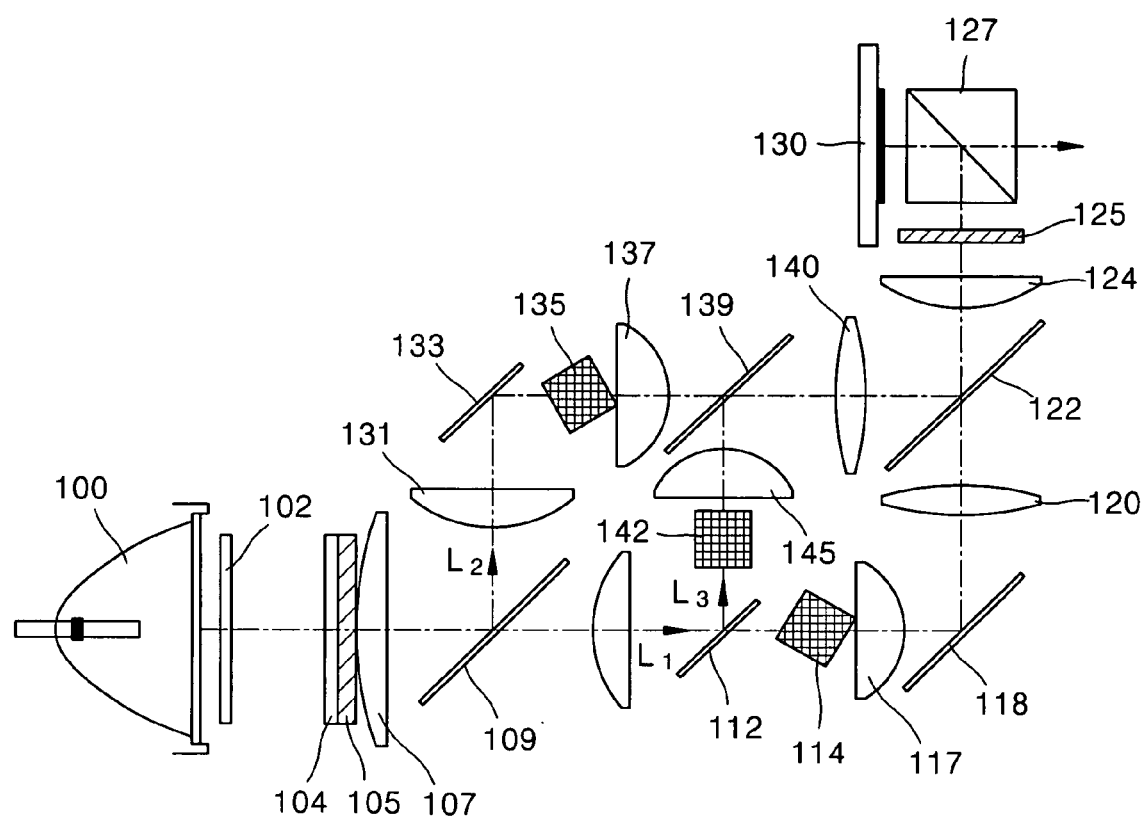
FIG. 1 is a schematic diagram of a conventional projection system.
Figure 2:
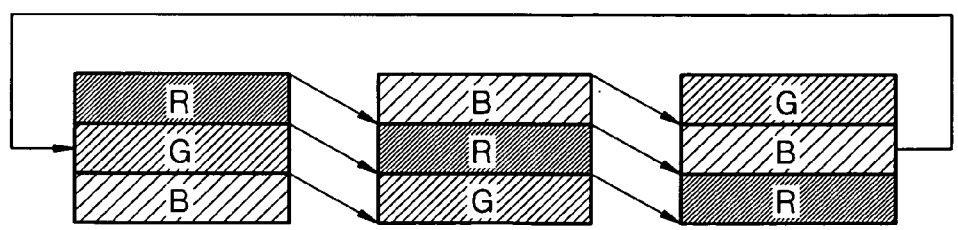
FIG. 2 illustrates R, G, and B color bars to explain the color scrolling operation of the conventional projection system of FIG. 1.

The present invention will now be described more fully with reference to the accompanying drawings, in which illustrative, non-limiting embodiments of the invention are shown. In the drawings, like reference numbers refer to like elements throughout, and the sizes of elements may be exaggerated for clarity.

Figure 3:
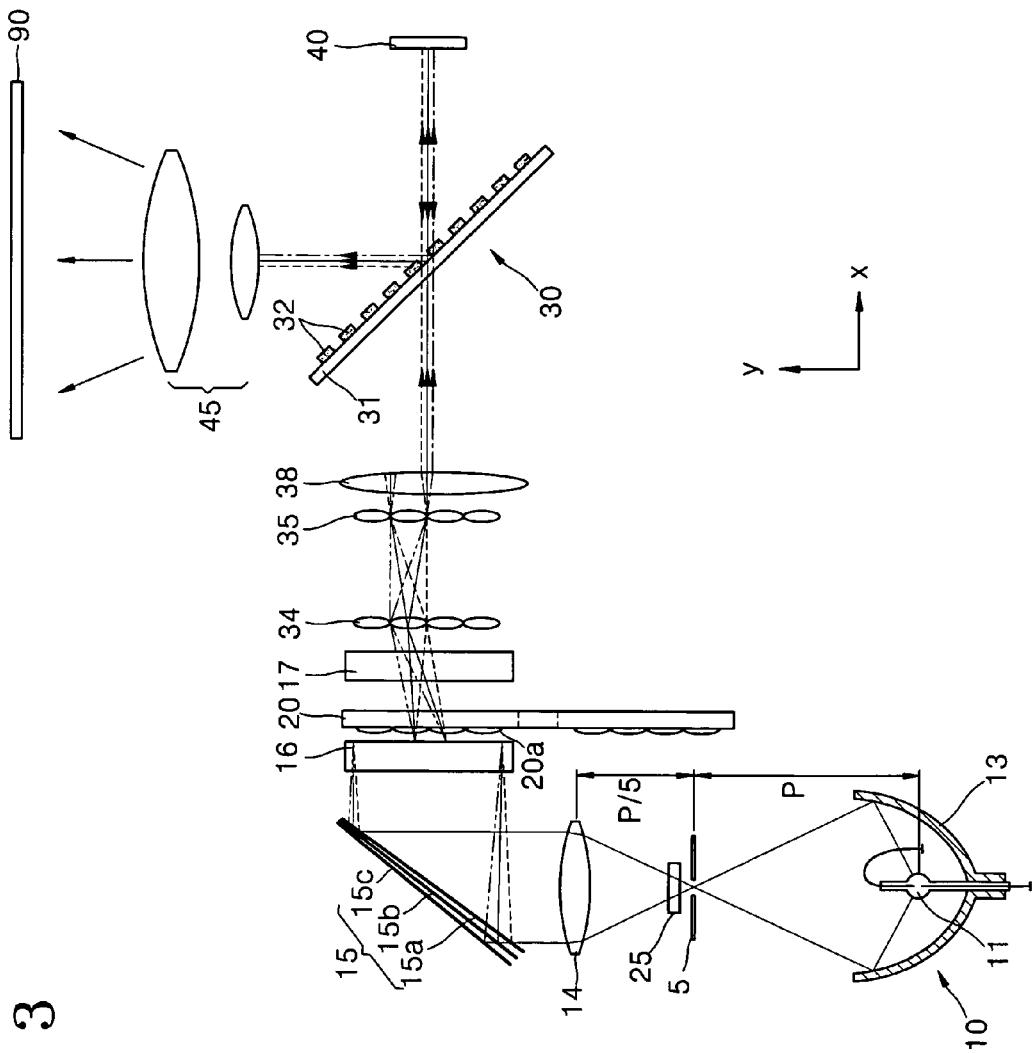
FIG. 3 is a schematic diagram of a projection system according to a first embodiment of the present invention.

FIG. 3 is a schematic diagram of a projection system according to a first embodiment of the present invention. Referring to FIG. 3, the projection system according to the first embodiment of the present invention includes a light source 10, a color separator 15, a scrolling unit 20, a light valve 40, a wire grid polarization beam splitter 30, and a projection lens unit 45. The color separator 15 separates light emitted from the light source 10 into color beams, namely, R, G, and B beams. The scrolling unit 20 scrolls R, G, and B beams, into which the beam emitted from the light source 10 has been separated by the color separator 15. The light valve 40 processes the beams transmitted by the scrolling unit 20 according to an image signal and forms a picture. The wire grid polarization beam splitter (PBS) 30 transmits or reflects an incident beam according to a polarization of the incident beam. The projection lens unit 45 magnifies the picture formed by the light valve 40 and reflected by the wire grid PBS 30 and projects the magnified picture onto a screen 90.

The light source 10 emits white light and comprises a lamp 11, for generating light, and a reflection mirror 13, for reflecting light emitted from the lamp 11 and for guiding the path of the reflected light. The reflection mirror 13 may be an elliptical mirror whose first focal point is the position of the lamp 11 and whose second focal point is a point where light is focused. Alternatively, the reflection mirror 13 may be a parabolic mirror which uses the lamp 11 as a focal point and which collimates light beams emitted from the lamp 11. The reflection mirror 13 shown in FIG. 3 is an elliptical mirror. If a parabolic mirror is used as the reflection mirror 13, a lens for focusing light must also be included.

A collimating lens 14 for collimating incident light is installed on a light path between the light source 10 and the color separator 15. P denotes the distance between the light source 10 and the focal point of the reflection mirror 13 where light emitted from the light source 10 is focused. Preferably, but not necessarily, the collimating lens 14 is installed at a distance of P/5 from the focal point. By installing a projection system in this way, the structure of an optical system can be made more compact.

A spatial filter 5, having a slit, is installed between the light source 10 and the collimating lens 14. The spatial filter 5 controls the divergence angle (or etendue) of light emitted from the light source 10 and is preferably, but not necessarily, installed at the focal point of the reflection mirror 13. The spatial filter 5 can control the width of the slit. The width of the slit may be controlled in a color separation direction or a color scrolling direction.

Figure 4:
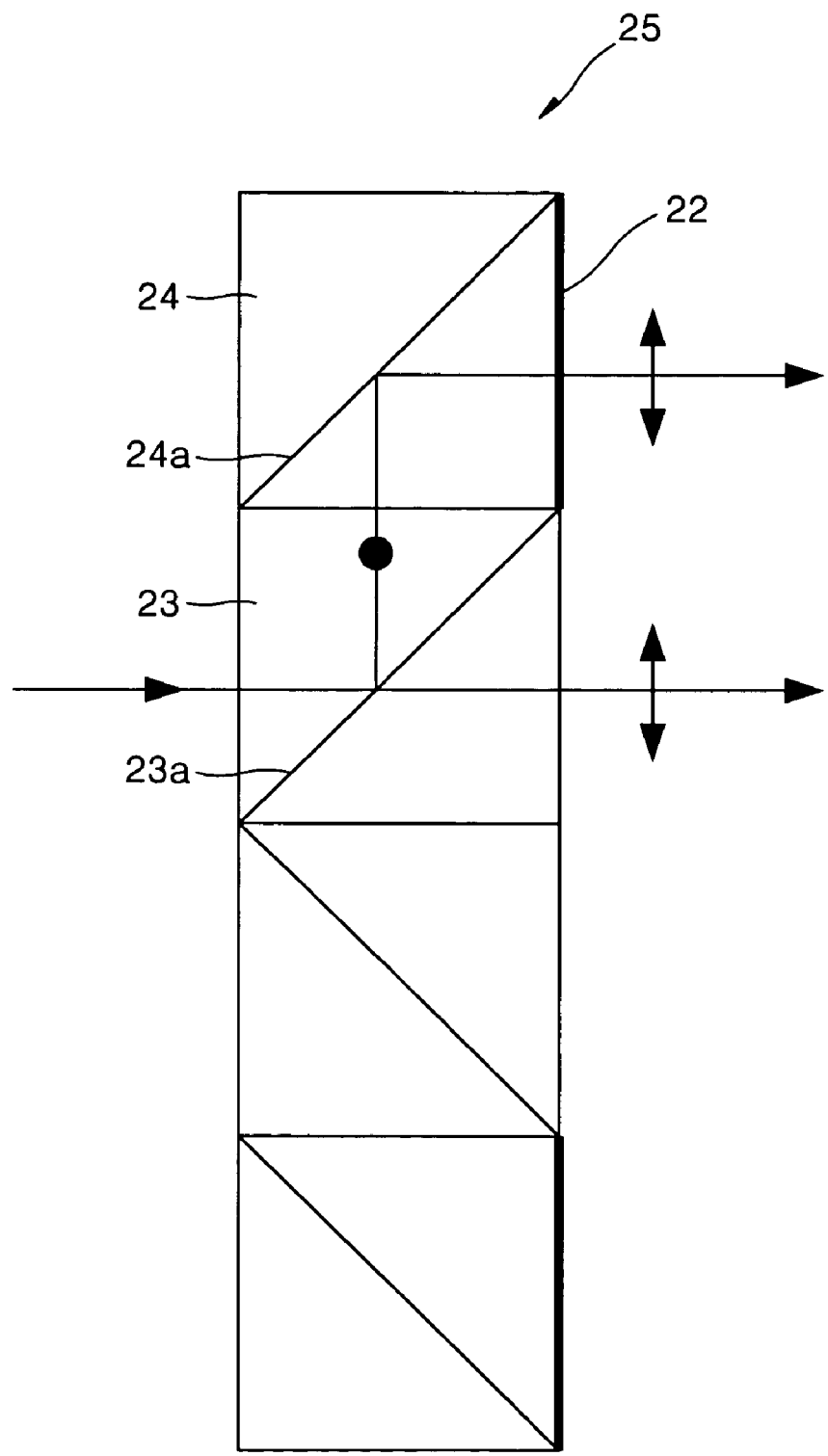
FIG. 4 is a side view of the polarization conversion system (PCS) of FIG. 3.

A polarization conversion system (PCS) 25 is located between the spatial filter 5 and the collimating lens 14 and polarizes an incident light. A side view of the PCS 25 is shown in FIG. 4. Referring to FIG. 4, the PCS 25 comprises first and second PBSs 23 and 24 and a ½ wavelength plate 22. The first and second PBSs 23 and 24 are installed perpendicular to the traveling direction of the light beam. The ½ wavelength plate 22 is installed on the second PBS 24 and changes the polarization direction of an incident beam.

The first PBS 23 transmits a first light beam having one polarization from an unpolarized incident light beam toward the collimating lens 14, and at the same time, reflects a second light beam having the other polarization toward the second PBS 24. To reflect the second light beam, the first PBS 23 includes a first polarization filter 23*a*. As shown in FIG. 4, when a white light beam formed by combining light having a P polarization (which is parallel to the paper) and light having an S polarization (which is perpendicular to the paper) is incident upon the first PBS 23, the first polarization filter 23*a* transmits the light with the P polarization and reflects the light with the S polarization.

The second PBS 24 reflects the second light beam reflected by the first PBS 23 so that the second light beam advances toward the collimating lens 14. The second PBS 24 changes only the path of an incident light beam without changing its polarization, and the second light beam, transmitted by the second PBS 24, travels parallel to the first light beam, transmitted by the first PBS 23. The second PBS 24 comprises a second polarization filter 24*a* for reflecting a light beam with a specific polarization, for example, an S polarization from the unpolarized incident light beam. The second polarization filter 24*a* may be a total reflection mirror for totally reflecting an incident light beam.

The ½ wavelength plate 22 changes the phase of an incident light beam with one polarization by 90 degrees. In other words, the ½ wavelength plate 22 changes a received light beam of one polarization to a light beam of the other polarization. As shown in FIG. 4, the ½ wavelength plate 22 changes the first light beam having an S polarization reflected by the second polarization filter 24*a* to a light beam having a P polarization like the first light beam.

Instead of being installed on the second PBS 24, the ½ wavelength plate 22 may be installed on the first PBS 23 so that the polarization of the first light beam is changed to that of the second light beam. Due to the use of the ½ wavelength plate 22, all of the light emitted from the light source 10 can be used, which increases the light efficiency.

The color separator 15 separates the light emitted from the light source 10 into three color beams; namely, R, G, and B beams. The color separator 15 includes first, second, and third dichroic filters 15*a*, 15*b*, and 15*c* disposed at different angles with respect to an incident light axis. The color separator 15 separates incident light according to predetermined wavelength ranges and reflects the separated light beams at different angles. For example, the first dichroic filter 15*a* reflects a beam in the red wavelength range, R, of white incident light and transmits beams in the green and blue wavelength ranges, G and B. The second dichroic filter 15*b* reflects the G beam of the beams transmitted by the first dichroic filter 15*a* and transmits the B beam. The third dichroic filter 15*c* reflects the B beam transmitted by the first and second dichroic filters 15*a* and 15*b*. Consequently, the R, G, and B beams, into which incident light has been separated according to wavelength by the first, second, and third dichroic filters 15*a*, 15*b*, and 15*c*, are reflected at different angles. That is, the R and B beams are focused on the G beam and all three beams coincide at the scrolling unit 20.

The scrolling unit 20 includes at least one lens cell and scrolls the R, G, and B beams produced by the color separator 15. The scrolling unit 20 scrolls incident color beams by converting the rotation of the lens cell into a rectilinear motion of an area of the lens cell through which light passes. This scrolling will be described later in greater detail.

Figure 5:
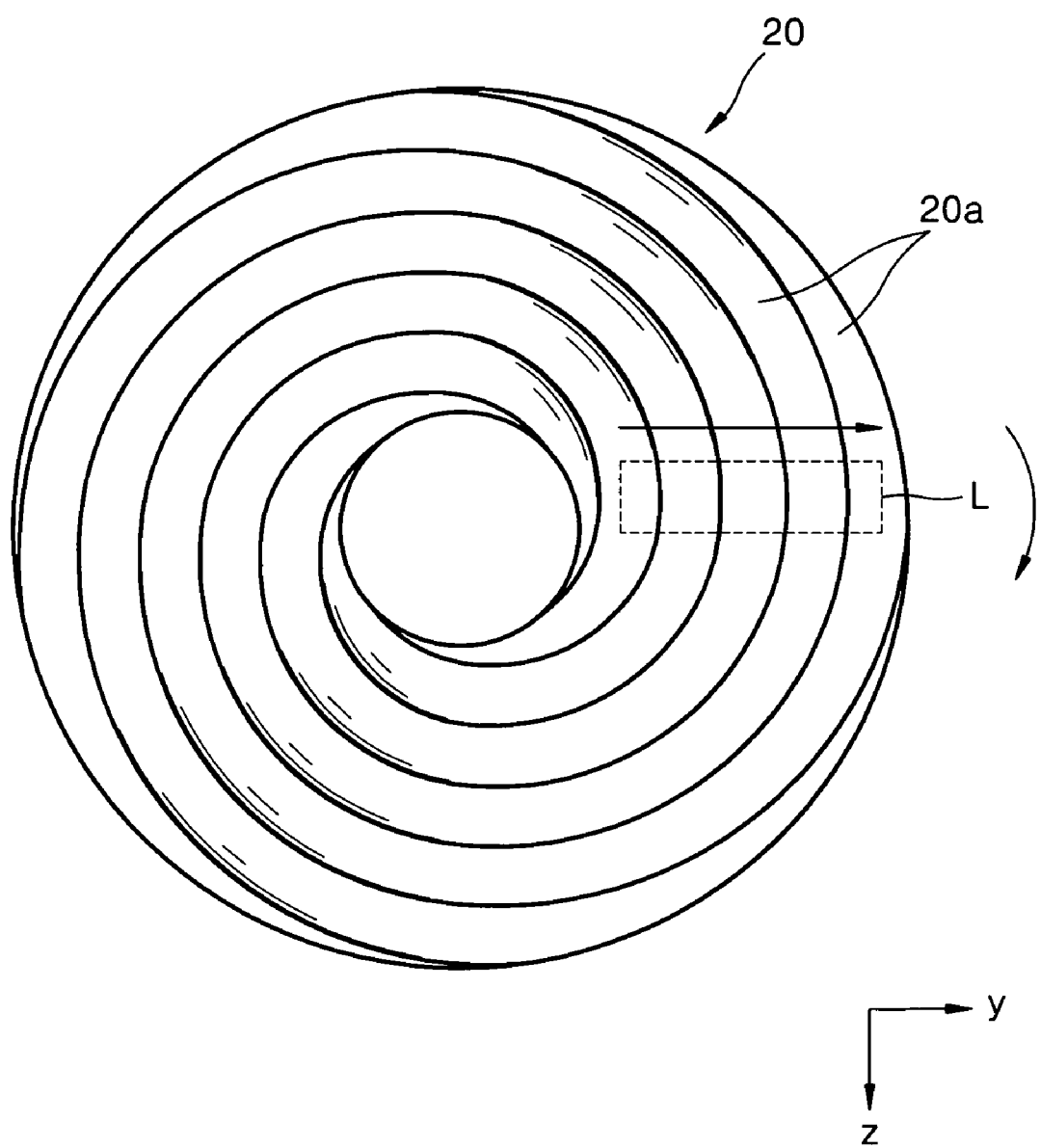
FIG. 5 is a front view of the scrolling unit of FIG. 3.

The scrolling unit 20 is a spiral lens disk including at least one cylindrical lens cell 20*a*, which is disposed spirally on the scrolling unit 20, as illustrated in FIG. 3. FIG. 5 is a front view of a spiral lens disk used as the scrolling unit 20. Referring to FIG. 5, reference character L denotes an area of the scrolling unit 20 on which a beam is incident.

Figure 6:
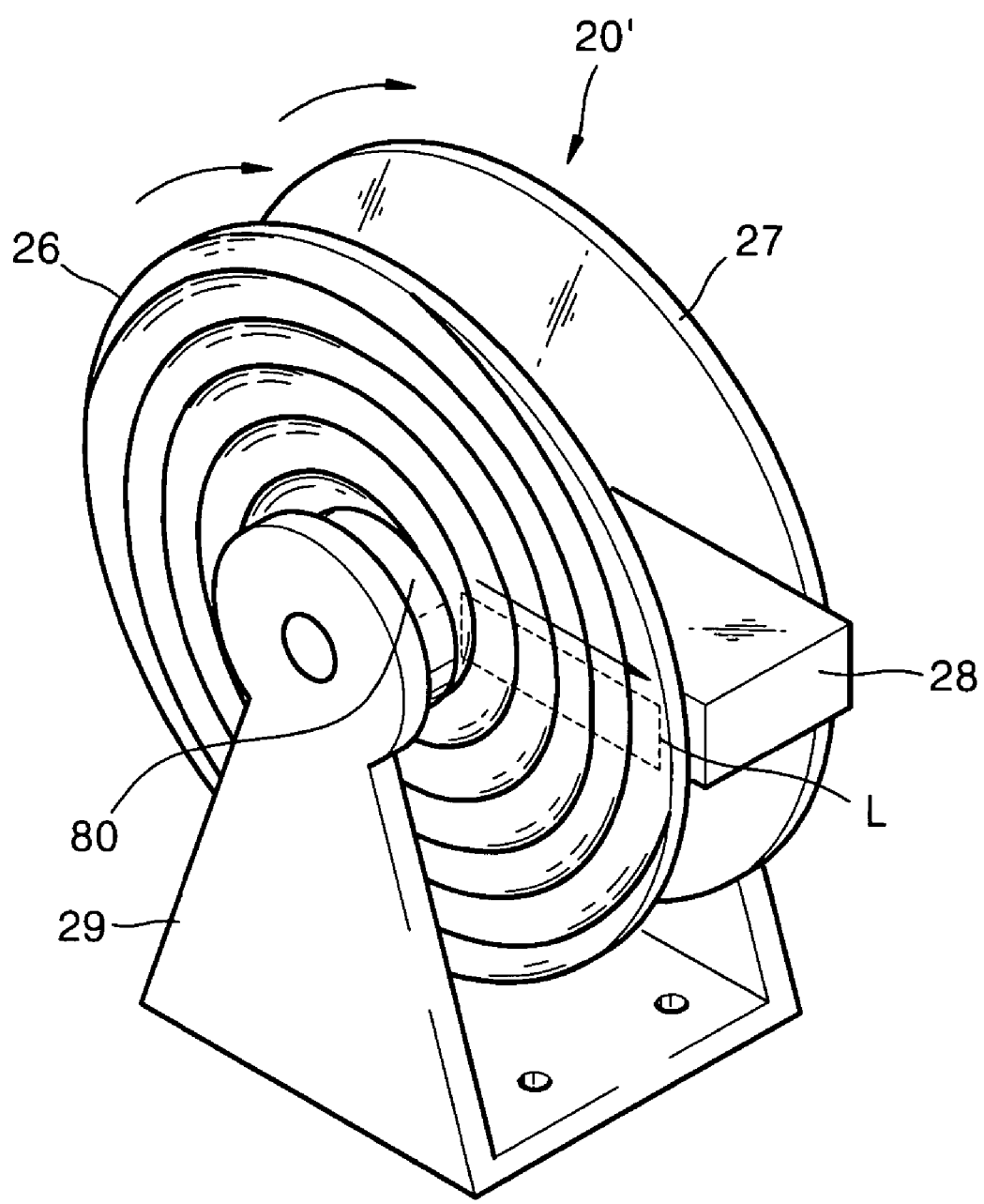
FIG. 6 is a perspective view of another scrolling unit that can be used in the projection system of FIG. 3.

FIG. 6 is a perspective view of a scrolling unit 20' that can be adopted in the projection system of FIG. 3. Referring to FIG. 6, the scrolling unit 20' includes first and second spiral lens disks 26 and 27, disposed a predetermined distance from each other, and a glass rod 28, interposed between the first and second spiral lens disks 26 and 27. A spiral arrangement of cylindrical lens cells is disposed on at least one side of each of the first and second spiral lens disks 26 and 27. The first and second spiral lens disks 26 and 27 can be rotated and are supported by a bracket 29 such that they are rotated at the same speed by a driving source 80.

Referring back to FIG. 3, first and second cylindrical lenses 16 and 17 are installed in front of and behind the scrolling unit 20, respectively. First and second fly-eye lens arrays 34 and 35 and a relay lens 38 are disposed on a light path between the second cylindrical lens 17 and the wire grid PBS 30. The width of a light beam incident upon the scrolling unit 20 is reduced by the first cylindrical lens 16, thereby reducing light loss. The light transmitted by the scrolling unit 20 is returned to its original width by the second cylindrical lens 17.

Figure 7:
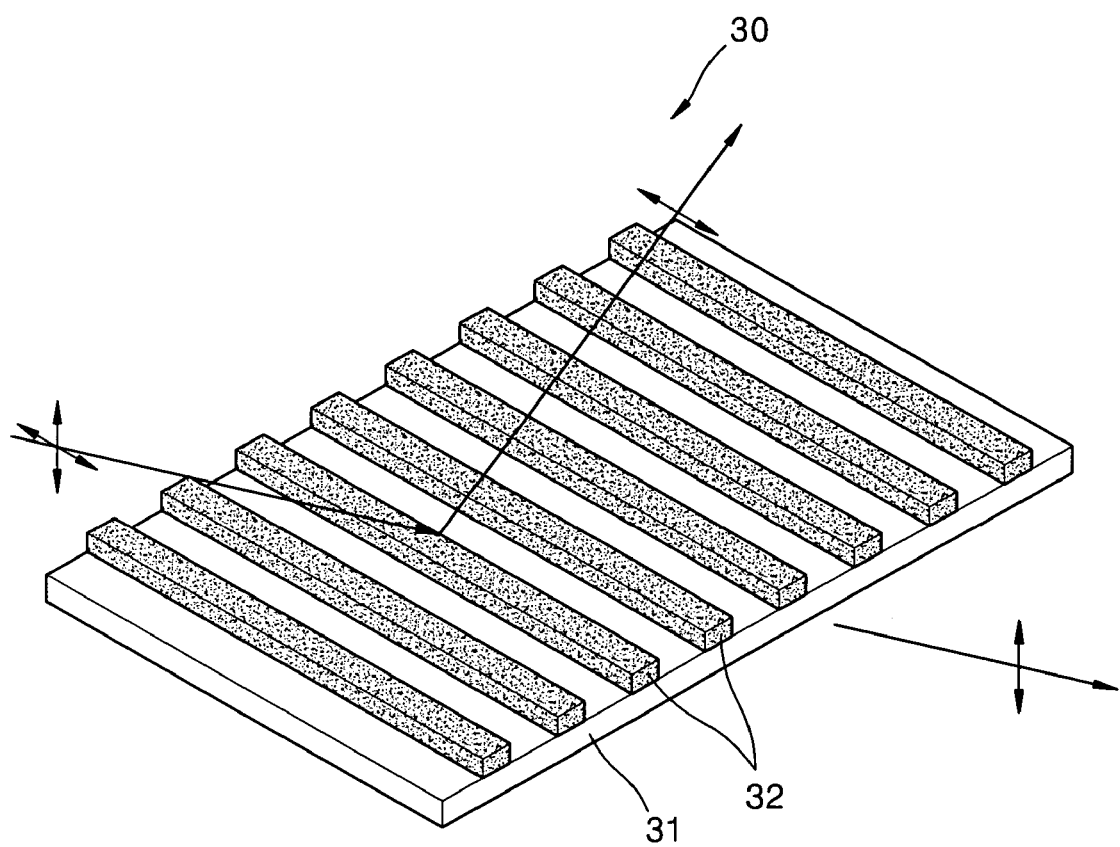
FIG. 7 is a perspective view of the wire grid polarization beam splitter of FIG. 3.

The wire grid PBS 30 is installed between the relay lens 38 and the light valve 40. FIG. 7 is a perspective view of the wire grid PBS 30. The wire grid PBS 30 includes a substrate 31 and wire grids 32, which are arranged in parallel at regular intervals and are disposed on one side of the substrate 31. The substrate 31 is made of glass, and the wire grids 32 are formed of a conductive material. The wire grid PBS 30 transmits or reflects an incident beam according to a polarization of the incident beam. More specifically, as illustrated in FIG. 7, the wire grid PBS 30 reflects a first polarized beam, for example, an S-polarized beam of an incident beam and transmits a second polarized beam, for example, a P-polarized beam. The use of the wire grid PBS 30 prevents improper polarization separation of a beam with a wide incidence angle by a MacNeille type PBS, thereby improving contrast.

The wire grid PBS 30 is installed at an angle to an incident light axis. Referring to FIG. 3, the wire grid PBS 30 is preferably, but not necessarily, disposed such that the wire grids 32 are on the side of the wire grid PBS 30 that faces the light valve 40. This disposition of the wire grid PBS 30 prevents the beam emitted from the light valve 40 from passing through the glass substrate 31, so that an aberration, such as astigmatism, is not generated.

The light valve 40 processes the light transmitted by the scrolling unit 20 and the wire grid PBS 30 according to an image signal and forms a color picture. The light valve 40 is a reflective liquid crystal display. The polarization of the second polarized beam transmitted by the wire grid PBS 30 is changed by modulation of each of the cells of the light valve 40, and the resultant beam re-enters the wire grid PBS 30 and is reflected thereby toward the projection lens unit 45.

The projection lens unit 45 magnifies the color picture that is formed by the light valve 40 and reflected by the wire grid PBS 30 and projects the magnified color picture onto the screen 90.

The operation of the projection system of FIG. 3 with the above-described configuration will now be described with reference to FIG. 3. First, white light emitted from the light source 10 is incident upon the color separator 15 via the spatial filter 5, the PCS 25, and the collimating lens 14.

Next, the white light incident upon the color separator 15 is separated into three color beams, namely, R, G, and B beams, by the first, second, and third dichroic filters 15*a*, 15*b*, and 15*c*, and then the R, G, and B beams are incident upon the scrolling unit 20. The width of the light incident upon the scrolling unit 20 is reduced by the first cylindrical lens 16 located in front of the scrolling unit 20.

Figure 8A:
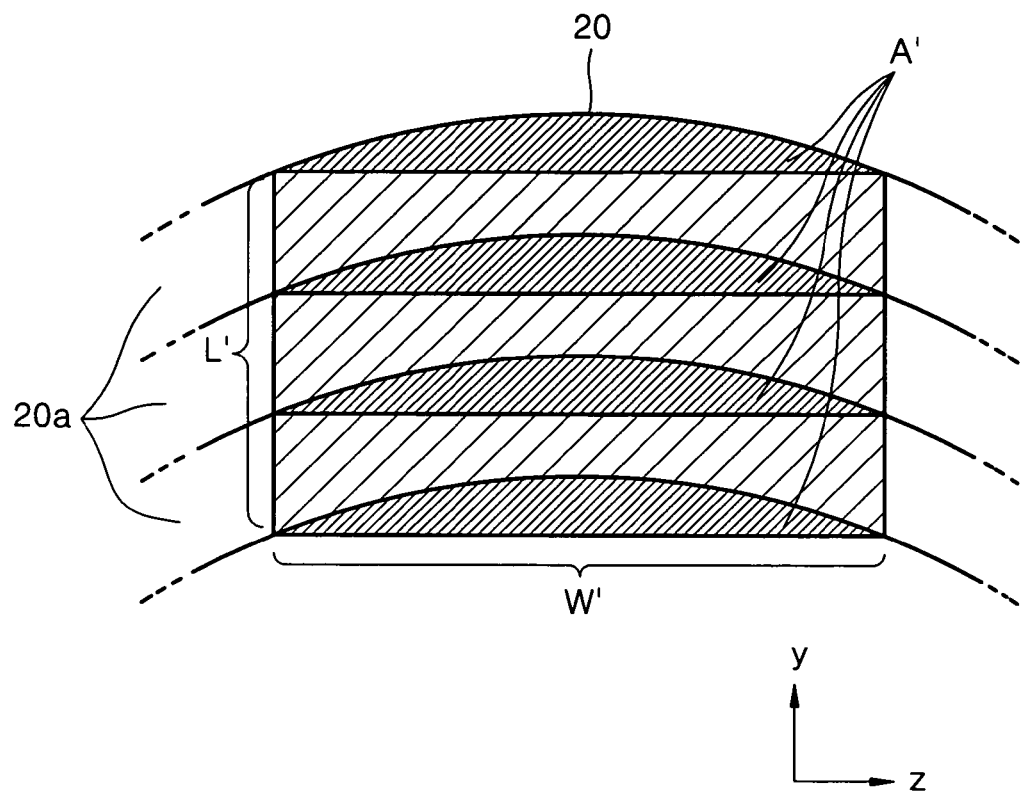
FIG. 8A illustrates the shape of a beam landing on a spiral lens disk when no cylindrical lenses are used in the projection system of FIG. 3.
Figure 8B:
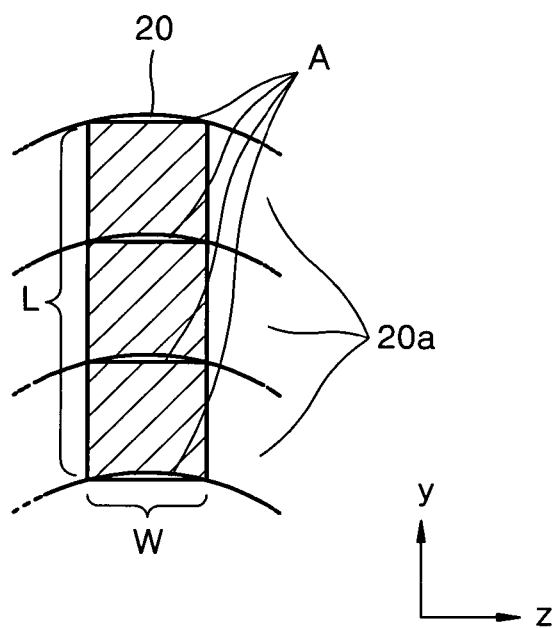
FIG. 8B illustrates the shape of a beam landing on a spiral lens disk when a cylindrical lens is used in the projection system of FIG. 3.

FIG. 8A illustrates a beam L' that is emitted from the light source 10 and incident on the scrolling unit 20 without passing through the first cylindrical lens 16. Beam L' has a width W'. FIG. 8B illustrates a beam L that has a width W reduced by the first cylindrical lens 16 and which is then incident upon the scrolling unit 20. When a beam passing through the scrolling unit 20 is relatively wide, that is, in the case of the beam L', the curved shape of the array of spirally arranged lens cells 20*a* does not match with that of the beam L', and thus there is light loss over an unmatched area A' for each color. To minimize the light loss, preferably, but not necessarily, the first cylinder lens 16 is included so that the beam L with a reduced width W is produced as illustrated in FIG. 8B. The shape of the array of spirally arranged lens cells 20*a*, as illustrated in FIG. 8B, aligns more closely with that of the beam L. Hence, an unmatched area A, for each color, when the first cylindrical lens 16 is used is smaller than the unmatched area A', when a cylindrical lens is not used. Consequently, the light loss is reduced by the use of the cylindrical lens.

Referring back to FIG. 3, the R, G, and B beams with reduced widths are transmitted by the scrolling unit 20, and then the R, G, and B beams are returned to their original widths while passing through the second cylindrical lens 17. As described above, by controlling the width of light using the first and second cylindrical lenses 16 and 17, light loss can be reduced, and the quality of a color picture can be improved.

Next, the R, G, and B beams transmitted by the second cylindrical lens 17 are focused on each of the lens cells of the first and second fly-eye lens arrays 34 and 35. The focused R, G, and B beams are separated while passing through the relay lens 38, and the separated R, G, and B beams are incident on corresponding color areas of the light valve 40, and color bars are formed.

Before reaching the light valve 40, the R, G, and B beams transmitted by the relay lens 38 are transmitted or reflected by the wire grid PBS 30 according to polarizations of the R, G, and B beams. While the R, G, and B beams are being reflected by the light valve 40, the polarizations of the R, G, and B beams are changed by modulation of each of the cells of the light valve 40. Then, the R, G, and B beams with the changed polarization are reflected by the wire grid PBS 30 toward the projection lens unit 45.

Figure 9A:
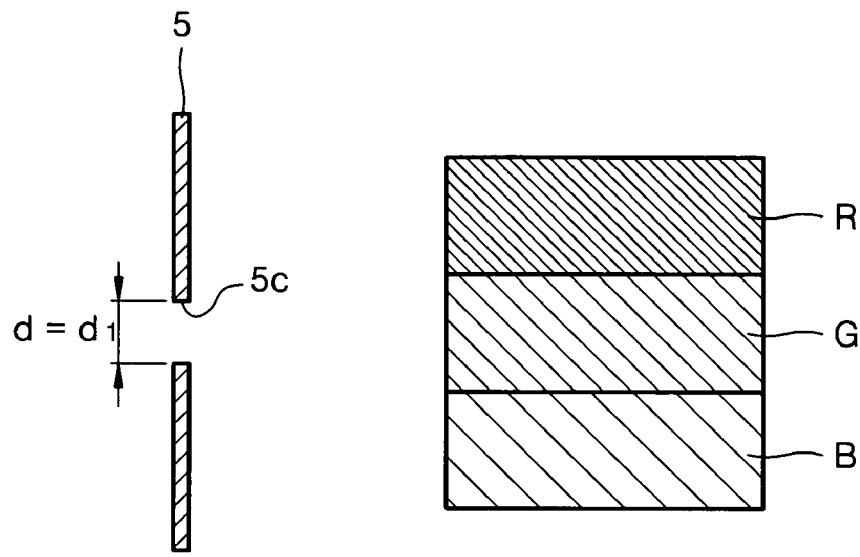
FIGS. 9A through 9C show color bars produced by different spatial filters of the projection system of FIG. 3.
Figure 9B:
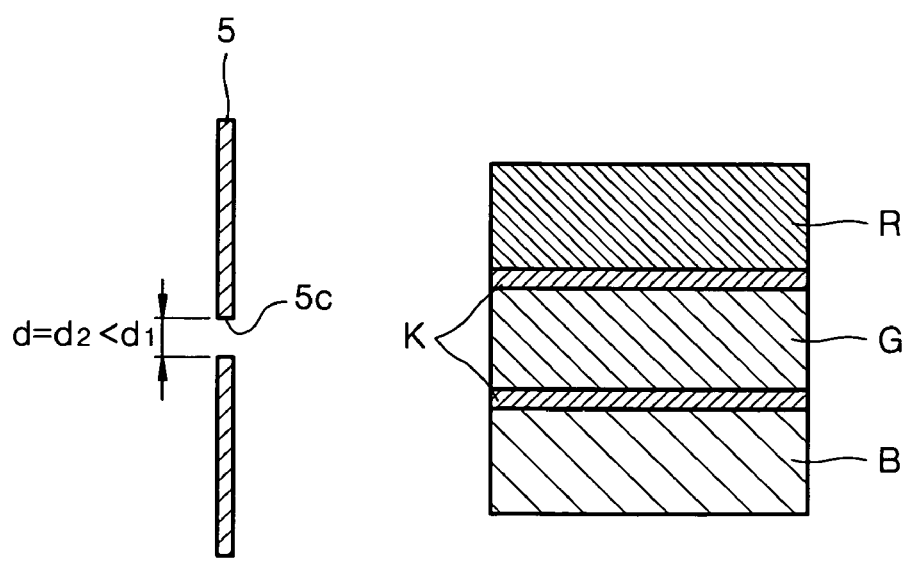
Figure 9C:
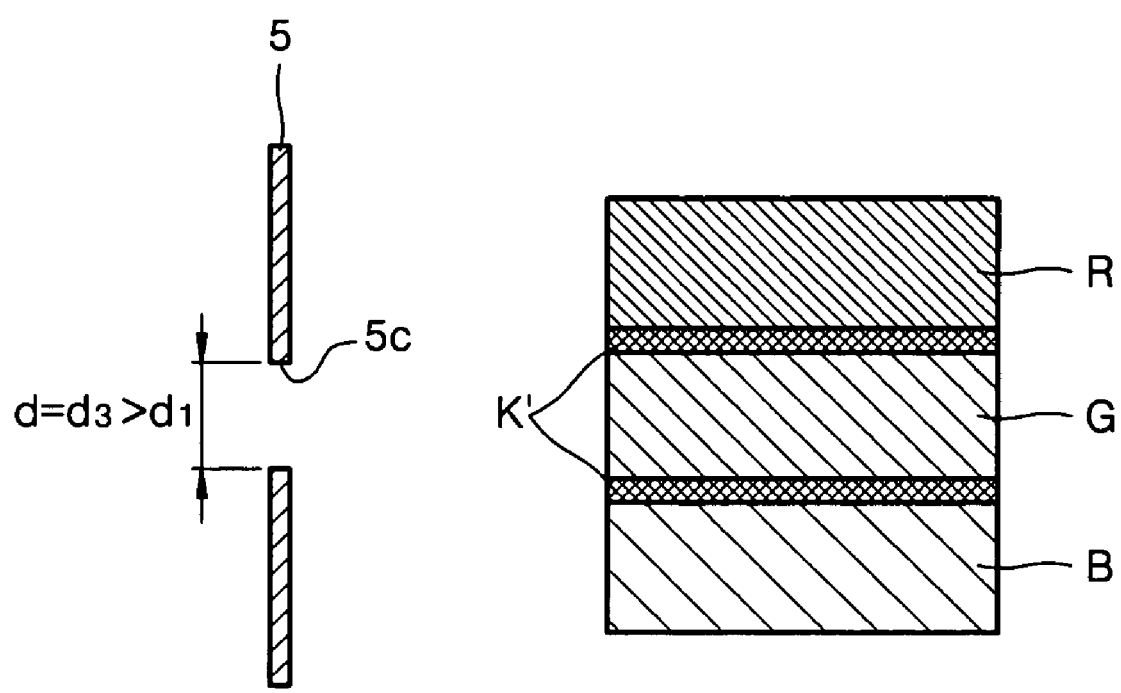

As the width of the slit formed in the spatial filter 5 varies, the widths of color bars vary. FIGS. 9A through 9C show color bars with widths, which vary according to the width d of the slit of the spatial filter 5 of the projection system of FIG. 3. In FIG. 9A, the slit width d is $d_1$, and R, G, and B bars are formed in corresponding color areas of the light valve 40. If the slit width d changes from $d_1$ to $d_2$ ($d_2 < d_1$), black bars K are formed between adjacent color bars as illustrated in FIG. 9B. If the slit width d changes from $d_1$ to $d_3$ ($d_3 > d_1$), the R, G, and B bars are enlarged such that overlapping portions K' are formed between adjacent color bars as illustrated in FIG. 9C.

The scrolling of color bars formed on the light valve 40 will now be described with reference to FIGS. 10A through 10C. It is assumed that the scrolling unit 20 rotates in the direction indicated by an arrow as shown in FIG. 5.

Figure 10A:
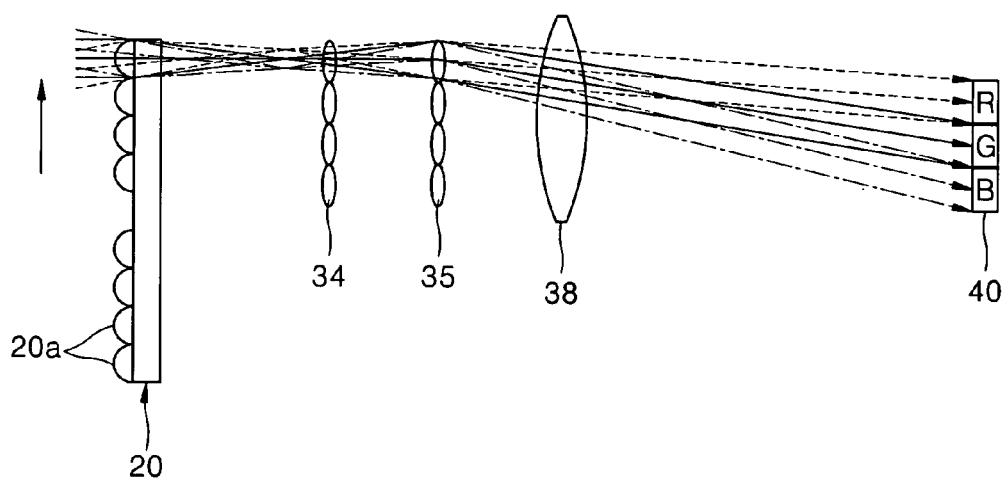
FIGS. 10A through 10C illustrate color scrolling that occurs in the projection system of FIG. 3.
Figure 10B:
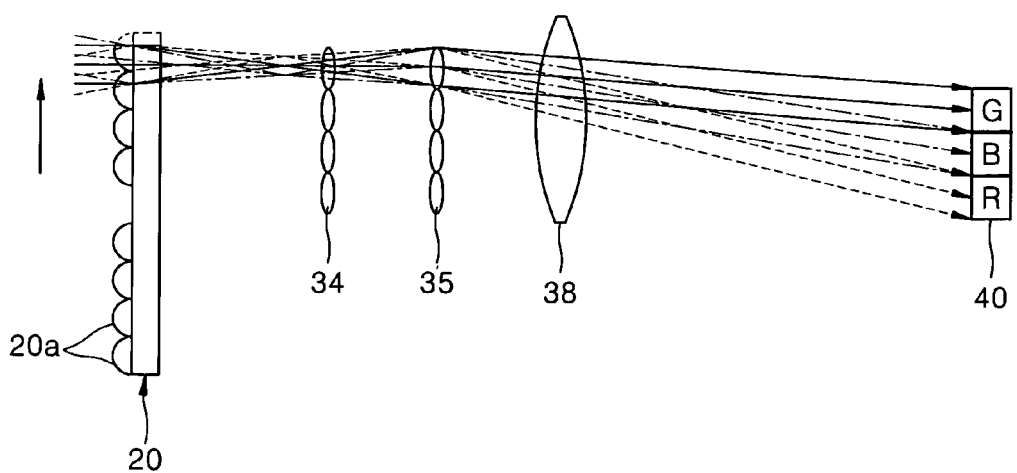
Figure 10C:
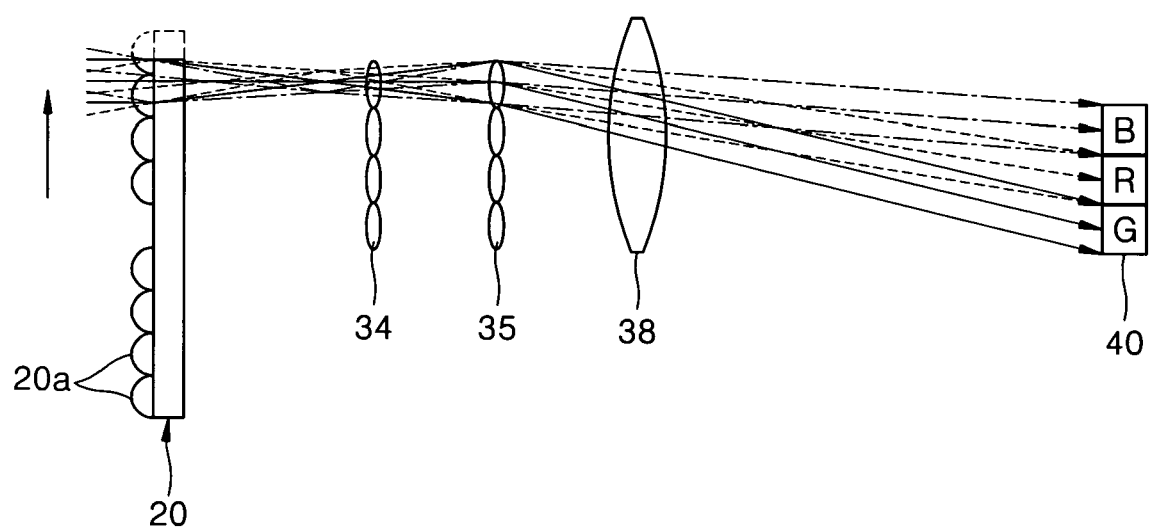

First, as illustrated in FIG. 10A, the R, G, and B beams produced by the color separator 15 are incident upon each of the lens cells 20*a* of the scrolling unit 20. After passing through the first and second fly-eye lens arrays 34 and 35 and the relay lens 38, the R, G, and B beams are incident on corresponding color areas of the light valve 40. Hence, R, G, and B color bars are formed on the light valve 40. The first and second fly-eye lens arrays 34 and 35 and the relay lens 38 focus incident color beams onto corresponding color areas of a light valve. First, the R, G, and B beams pass through the scrolling unit 20, the first and second fly-eye lens arrays 34 and 35, and the relay lens 38, and color bars are formed on the light valve 40 in a predetermined order, for example, in an order of R, G, and B. Next, the scrolling unit 20 rotates and the lens surface of the scrolling unit 20 gradually moves upward while the color beams pass through the scrolling unit 20. Accordingly, the focal points of the color beams passing through the scrolling unit 20 vary as the scrolling unit 20 moves, and color bars in an order of G, B, and R are formed, as illustrated in FIG. 10B. Then, the scrolling unit 20 rotates, the incident color beams are scrolled, and color bars in an order of B, R, and G are formed as illustrated in FIG. 10C. In other words, the locations of the lenses of the scrolling unit 20 upon which beams are incident change according to the rotation of the scrolling unit 20, and the rotation of the scrolling unit 20 causes a rectilinear motion of an area of a lens array of the scrolling unit 20 through which light passes so that scrolling is performed. Such scrolling is repeated periodically.

Color lines are formed on each of the lens cells 20a of the scrolling unit 20, and likewise, color lines are formed on each of the lens cells of the first fly-eye lens array 34. Preferably, but not necessarily, lens cells 20a of the scrolling unit 20 through which light passes are matched with lens rows of each of the first and second fly-eye lens arrays 34 and 35 in a one-to-one correspondence. In other words, if the number of lens cells 20a through which light passes is 4, each of the first and second fly-eye lens arrays 34 and 35 preferably has 4 lens rows.

The number of lens cells 20a of the scrolling unit 20 can be set to synchronize the scrolling unit 20 with the operating frequency of the light valve 40. That is, the higher the operating frequency of the light valve 40, the more lens cells 20a included in the scrolling unit 20 so that the scrolling speed can be increased while maintaining a constant rotation speed of the scrolling unit 20. Alternatively, the scrolling unit 20 can be synchronized with the operating frequency of the light valve 40 by controlling the rotation speed of the scrolling unit 20 while maintaining a constant number of the lens cells 20a of the scrolling unit 20.

Although an example where the scrolling unit 20 is a single spiral lens disk on which a plurality of cylindrical lens cells 20a are spirally arranged has been described above, various modifications can be made to the entire shape of the scrolling unit 20 as long as the rotation of the scrolling unit 20 causes a rectilinear motion of an area of a lens array of the scrolling unit 20 through which light passes so that color scrolling is performed. Hence, as illustrated in FIG. 6, the scrolling unit 20 may include a plurality of spiral lens disks.

As described above, in the present invention, a single scrolling unit can handle all colors without the need to install a separate scrolling unit for each individual color. Thereby, a projection system can be made compact.

Also, scrolling is performed by rotating the scrolling unit in one direction, without changing the rotation direction, thereby achieving continuous, consistent scrolling. Further, since the single scrolling unit is used to scroll all color beams, the speeds of all of the color bars are identical. Thus, the synchronization of the color bars is easily controlled.

Figure 11:
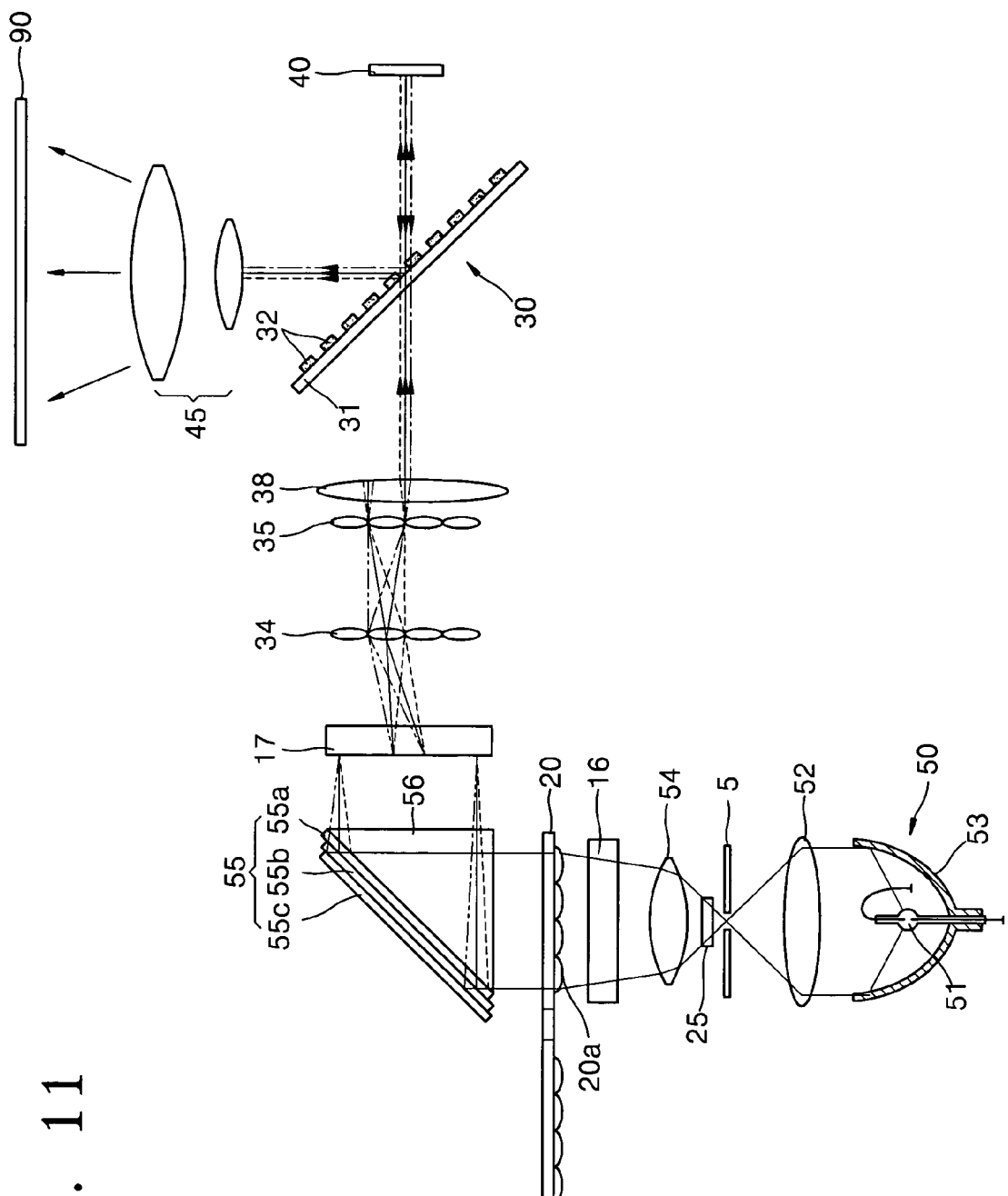
FIG. 11 is a schematic diagram of a projection system according to a second embodiment of the present invention.

FIG. 11 is a schematic diagram of a projection system according to a second embodiment of the present invention. Referring to FIG. 11, the projection system according to the second embodiment of the present invention includes a light source 50, a scrolling unit 20, a color separator 55, a light valve 40, a wire grid PBS 30, and a projection lens unit 45. The scrolling unit 20 rotates and scrolls a light beam emitted from the light source 50. The color separator 55 separates a light beam transmitted by the scrolling unit 20 according to color. The light valve 40 processes the beams transmitted by the color separator 55 according to an image signal, and forms a picture. The wire grid PBS 30 is located between the color separator 55 and the light valve 40 and transmits or reflects an incident beam according to a polarization of the incident beam. The projection lens unit 45 magnifies the picture formed by the light valve 40 and reflected by the wire grid PBS 30 and projects the magnified picture onto the screen 90.

The light source 50 emits white light and comprises a lamp 51, for generating light, and a reflection mirror 53, for reflecting light emitted from the lamp 51 and for guiding the path of the reflected light. The reflection mirror 53 may be an elliptical mirror whose first focal point is the position of the lamp 51 and whose second focal point is a point where light is focused. Alternatively, the reflection mirror 53 may be a parabolic mirror which uses the lamp 51 as a focal point and which collimates light beams emitted from the lamp 51.

The reflection mirror 53 shown in FIG. 11 is a parabolic mirror. In this case, a lens 52 for focusing light must also be included.

A spatial filter 5, for controlling the divergence angle (or etendue) of light emitted from the light source 50, a PCS 25, for converting an unpolarized incident beam into a beam having a single polarization, and a collimating lens 54, for collimating an incident beam, are sequentially arranged on a light path between the focusing lens 52 and the scrolling unit 20. Since the functions of the spatial filter 5, the PCS 25, and the collimating lens 54 have been described above, the description thereof will not be repeated.

The first cylindrical lens 16 that reduces the width of a light beam incident upon the scrolling unit 20 is disposed in front of the scrolling unit 20.

Referring to FIG. 5, the scrolling unit 20 may be a single spiral lens disk on which at least one cylindrical lens cell 20a is spirally arranged. Alternatively, referring to FIG. 6, the scrolling unit 20 may include first and second spiral lens disks 26 and 27 and a glass rod 28. Since the principle of scrolling incident light by rotation of the scrolling unit 20 has been described above, it will not be described again here.

The color separator 55 includes first, second, and third dichroic filters 55a, 55b, and 55c which transmit or reflect incident light according to color. The first, second, and third dichroic filters 55a, 55b, and 55c are disposed parallel to one another. Rays included in a light beam incident upon the scrolling unit 20 are transmitted at different angles according to different locations on each of the cylindrical lens cells 20a upon which the rays are incident. The light beam rays are reflected by the first, second, or third dichroic filter 55a, 55b, or 55c such that the light beam is separated according to color. Also, in contrast with the projection system of FIG. 3, a prism 56 is further included between the scrolling unit 20 and the color separator 55 such that an incident light is transferred to the color separator 55 without a change in the path of the light.

A second cylindrical lens 17, first and second fly-eye lens arrays 34 and 35, a relay lens 38, and a wire grid PBS 30 are sequentially arranged on the light path between the color separator 55 and the light valve 40. The second cylindrical lens 17 widens the beam narrowed by the first cylindrical lens 16 to a beam with the original width. Since the first and second fly-eye lens arrays 34 and 35, the relay lens 38, and the wire grid PBS 30 have been described above, they will not be described here in detail.

The light valve 40 processes the light transmitted by the wire grid PBS 30 according to an image signal and forms a color picture. Preferably, but not necessarily, the light valve 40 is a reflective liquid crystal display. The polarization direction of the beam transmitted by the wire grid PBS 30 is changed by modulation of each of the cells of the light valve 40, and the resultant beam re-enters the wire grid PBS 30 and is reflected thereby toward the projection lens unit 45.

The projection lens unit 45 magnifies the picture formed by the light valve 40 and reflected by the wire grid PBS 30 and projects the magnified picture onto the screen 90.

Figure 12:
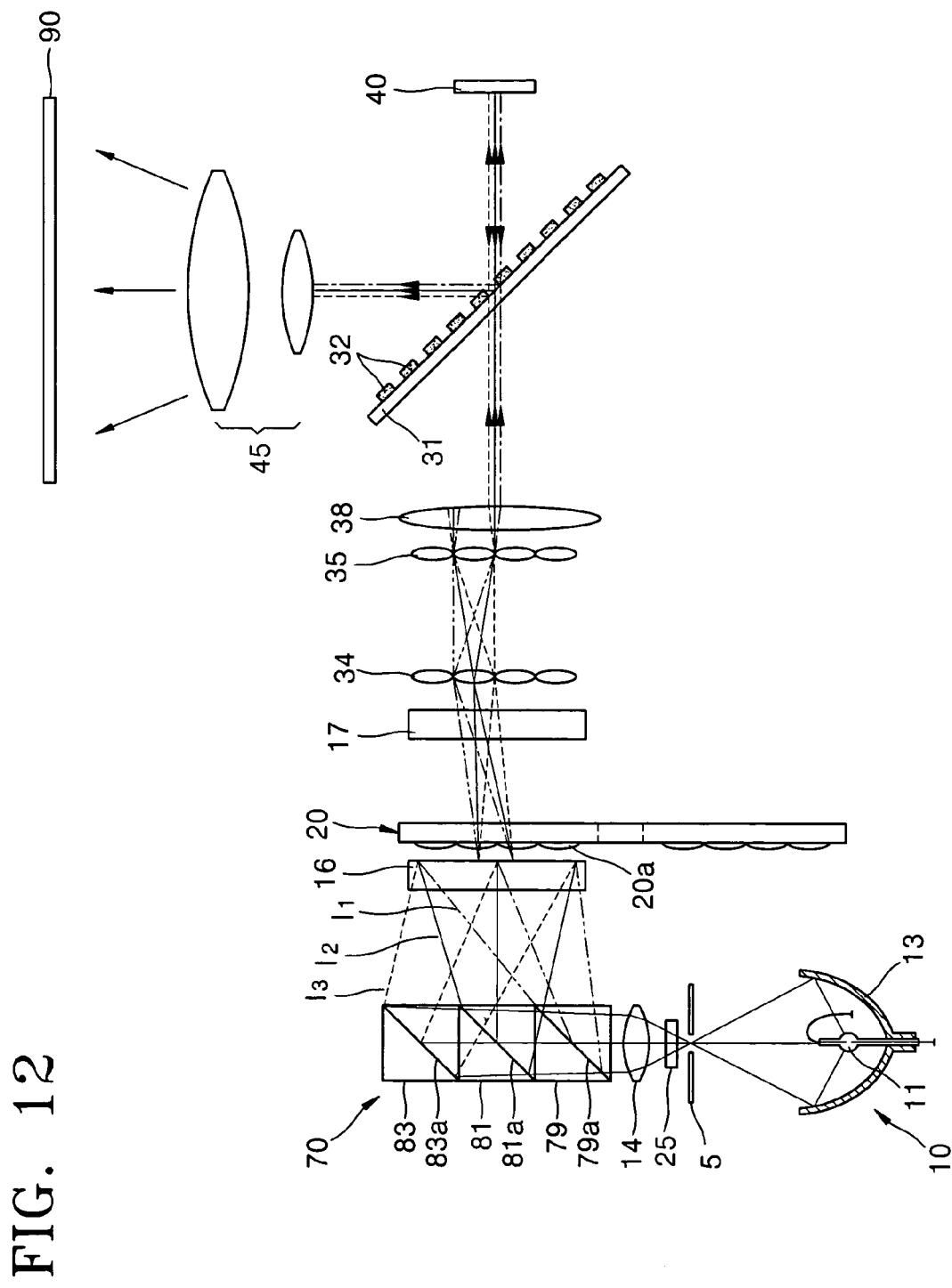
FIG. 12 is a schematic diagram of a projection system according to a third embodiment of the present invention.

FIG. 12 is a schematic diagram of a projection system according to a third embodiment of the present invention. Since the projection systems according to the first and third embodiments of the present invention are identical except that an optical pipe 70 is used as a color separator in the third embodiment of the present invention, only the optical pipe 70 will be described here in detail.

Referring to FIG. 12, the optical pipe 70 includes first, second, and third dichroic prisms 79, 81, and 83, each of which reflects a beam in a specific wavelength range and transmits beams in all other wavelength ranges such that light incident upon the optical pipe 70 is separated into first, second, and third color beams $I_1$, $I_2$, and $I_3$.

The first dichroic prism 79 includes a first dichroic filter 79a, which reflects a first color beam $I_1$ of the incident beam and transmits second and third color beams $I_2$, and $I_3$. For example, the first dichroic filter 79a can reflect an R beam and transmit G and B beams.

The second dichroic prism 81 is attached to the first dichroic prism 79 and includes a second dichroic filter 81a. The second dichroic filter 81a reflects the second color beam $I_2$, for example, the G beam, and transmits the first and third color beams $I_1$ and $I_3$, for example, the R and B beams.

The third dichroic prism 83 is attached to the second dichroic prism 81 and includes a third dichroic filter 83a. The third dichroic filter 83a reflects the third color beam $I_3$, for example, the B beam, and transmits the first and second color beams $I_1$ and $I_2$, for example, the R and G beams. The third dichroic filter 83a may be replaced by a total reflection mirror which reflects the entire incident beam.

The light emitted from the light source 10 is separated into beams of different colors by the optical pipe 70 with the above-described configuration, and the beams of different colors are directed toward the scrolling unit 20.

As described above, a projection system according to the present invention has the following effects. First, the use of a wire grid PBS prevents improper polarization separation of a beam with a wide incidence angle by a MacNeille type PBS, thereby improving the contrast of a color picture.

Second, because the wire grid PBS is disposed such that wire grids of the wire grid PBS face the light valve, a beam emitted from the light valve does not pass through a glass substrate of the wire grid PBS, thereby preventing occurrences of aberration, such as, astigmatism.

Third, instead of including a plurality of scrolling units for individual colors, a single scrolling unit that handles all color beams is included, thereby reducing the size of the projection system.

Fourth, scrolling is performed by rotating the scrolling unit in one direction without changing the rotation direction, thereby achieving continuous, consistent scrolling. Also, because the single scrolling unit is used to scroll all color bars, the color bars can be scrolled at an equal speed. Thus, synchronization of the color bars is easily controlled.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A projection system comprising:
a light source;
a color separator which separates an incident beam according to color;
a scrolling unit comprising at least one lens cell, which converts a rotation of the lens cell into a rectilinear motion of an area of the lens cell through which light passes so that the incident beam is scrolled;
a light valve which processes a beam transmitted by the color separator and the scrolling unit according to an image signal and forms a color picture;
a wire grid polarization beam splitter disposed in front of the light valve, which transmits or reflects an incident beam according to a polarization of the incident beam;
a projection lens unit which magnifies the color picture formed by the light valve and reflected by the wire grid polarization beam splitter and projects the magnified color picture onto a screen; and
first and second fly-eye lens arrays which are sequentially disposed on a light path between the scrolling unit and the light valve;
wherein the color separator comprises first, second, and third dichroic filters, which are disposed in parallel between the scrolling unit and the light valve and which each reflect a beam of color and transmit beams of all other colors.

2. The projection system of claim 1, wherein the wire grid polarization beam splitter comprises a substrate and wire grids, which are formed on one surface of the substrate, and the wire grid polarization beam splitter is disposed such that the wire grids face the light valve.

3. The projection system of claim 1, further comprising a prism installed in front of the color separator.

4. The projection system of claim 1, wherein the scrolling unit comprises a spiral lens disk on which at least one cylindrical lens cell is spirally arranged.

5. The projection system of claim 1, wherein the scrolling unit comprises first and second spiral lens disks, which are disposed apart from each other and each includes at least one cylindrical lens cell that is spirally arranged, and a glass rod installed between the first and second spiral lens disks.

6. The projection system of claim 1, wherein the light valve is a reflective liquid crystal display.

7. The projection system of claim 1, further comprising a spatial filter disposed between the light source and the scrolling unit, which controls a divergence angle of the light emitted from the light source.

8. The projection system of claim 1, further comprising a polarization conversion system disposed on a light path between the light source and the scrolling unit, which converts an unpolarized incident beam into a beam having a single polarization.

9. The projection system of claim 1, further comprising a collimating lens disposed on a light path between the light source and the scrolling unit, which collimates incident light.

10. The projection system of claim 1, further comprising first and second cylindrical lenses which are respectively disposed in front of and behind the scrolling unit.

11. The projection system of claim 1, further comprising a relay lens which is disposed on a light path between the second fly-eye lens array and the light valve.

12. A projection system comprising:
a light source;
a color separator which separates an incident light beam according to color;
a scrolling unit comprising at least one lens cell, which converts a rotation of the lens cell into a rectilinear motion of an area of the lens cell through which light passes so that the incident beam is scrolled;
a light valve which processes a beam transmitted by the color separator and the scrolling unit according to an image signal and forms a color picture;
a wire grid polarization beam splitter disposed in front of the light valve, which transmits or reflects an incident beam according to a polarization of the incident beam;
a projection lens unit which magnifies the color picture formed by the light valve and reflected by the wire grid polarization beam splitter and projects the magnified color picture onto a screen; and first and second fly-eye lens arrays which are sequentially disposed on a light path between the scrolling unit and the light valve;

wherein the color separator comprises first, second, and third dichroic prisms, which are sequentially attached to one another between the light source and the scrolling unit, and the first, second, and third dichroic prisms respectively include first, second, and third dichroic filters, each of which reflects a beam of a color and transmits beams of all other colors.

13. A projection system comprising:

a light source;

a color separator which separates an incident beam according to color;

a scrolling unit comprising at least one lens cell, which converts a rotation of the lens cell into a rectilinear motion of an area of the lens cell through which light passes so that the incident beam is scrolled;

a light valve which processes a beam transmitted by the color separator and the scrolling unit according to an image signal and forms a color picture;

a wire grid polarization beam splitter disposed in front of the light valve, which transmits or reflects an incident beam according to a polarization of the incident beam; and a projection lens unit which magnifies the color picture formed by the light valve and reflected by the wire grid polarization beam splitter and projects the magnified color picture onto a screen;

wherein the color separator comprises first, second, and third dichroic filters, which are disposed in parallel between the scrolling unit and the light valve and which each reflect a beam of color and transmit beams of all other colors; and wherein the scrolling unit comprises first and second spiral lens disks, which are disposed apart from each other and each includes at least one cylindrical lens cell that is spirally arranged, and a glass rod installed between the first and second spiral lens disks.

* * * * *